United States Patent [19]
Saito

[11] 4,045,805
[45] Aug. 30, 1977

[54] AUTOMATIC FOCUSING APPARATUS

[75] Inventor: Mitsuru Saito, Sakai, Japan

[73] Assignee: Minolta Camera Kabushiki Kaisha, Osaka, Japan

[21] Appl. No.: 641,040

[22] Filed: Dec. 15, 1975

[30] Foreign Application Priority Data

Dec. 19, 1974 Japan ............................... 49-147258

[51] Int. Cl.² ............................................. G03B 7/08
[52] U.S. Cl. ...................................... 354/25; 250/201
[58] Field of Search ............... 354/25; 356/4; 250/201

[56] References Cited

U.S. PATENT DOCUMENTS

| 3,450,018 | 6/1969 | John, Jr. | 354/25 |
| 3,896,457 | 7/1975 | Yamanishi et al. | 354/25 |
| 3,941,996 | 3/1976 | Stauffer | 354/25 |

OTHER PUBLICATIONS

"The Automatic Focusing of Optical Systems," The British Journal of Photography, July 4, 1975, pp. 594–596.

*Primary Examiner*—Russell E. Adams
*Attorney, Agent, or Firm*—Wenderoth, Lind & Ponack

[57] ABSTRACT

An apparatus for detecting the correctly focused image of the object projected on a focal plane, comprising a suitable optical system for forming the image of an object to be photographed on the focal plane, and a circuit which receives an electric signal transduced from the image light and controls a motor for displacing an objective lens assembly associated with the apparatus. Provision is made for eliminating detection of false signals which may erroneously control the motor, by employing a peak value holding circuit in the circuit means.

13 Claims, 11 Drawing Figures

Displacement of the reticle

AUTOMATIC FOCUSING APPARATUS

The present invention relates to focusing apparatus and more particularly to a focusing apparatus for use in photographic cameras or the like which automatically brings lens means employed in said apparatus to a correctly focused position.

Although there have conventionally been proposed a variety of automatic focusing apparatus for use in photographic cameras and the like, such focusing apparatus generally have disadvantages in that correct focusing thereby tends to be affected due to development of undesirable false focusing detection signals.

Figure 1:
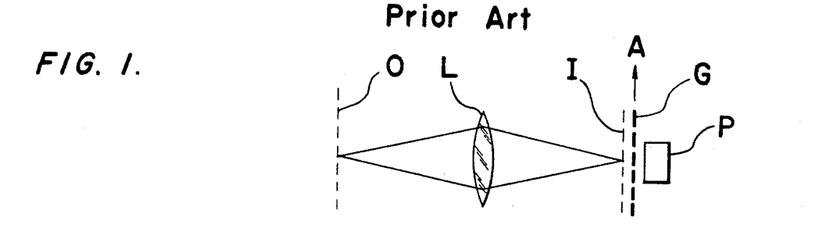

For example, in one of the known focusing apparatus which utilizes a chopper or reticle as a filter to convert spatial frequencies into temporal frequencies as shown in FIG. 1, wherein light from a preselected area on a subject O is passed through a lens L for focusing light image of the subject O on an scanning reticle G which is provided with a number of slots formed therein at regular intervals for permitting the image light to pass therethrough and causing the same to be blocked thereby alternately. In filtering spatial frequency, it is possible to use the element described in U.S. Pat. No. 3,781,110. The light which passes through reticle G is received by a photoconductive transducer means P, for example a photodiode, which produces an electric signal from its output in accordance with the amount of incident light thereon. When the reticle G having the light transmitting slot portions and the light blocking portions alternately at a pitch $d$ is moved in the direction of an arrow A at a velocity of V, the electric signal produced by the photodiode P will produce an alternating voltage component having a frequency of $v/d$. If the image I is correctly focused on the reticle G, the amplitude of the signal will be maximum. This effect can be explained as follows. On the assumption that the image I is also of a reticle construction having similar pitch $d$ to that of the reticle G, the alternating signal is produced by the photodiode P, as the reticle G is moved in relation to said image I, because of the fluctuation of the amount of light passing through the light transmitting slot portions of the reticle G. When the light transmitting slot portions of the reticle G coincide with the corresponding slot portions of the assumed reticle of the image I, none of the light is likely to pass therethrough, thus resulting in minimum signal produced from the photodiode P. The difference of intensities between said maximum and minimum signals, obtained from the photodiode P in the above described combinations of the reticle G and the image I will be the largest in comparison with other combinations therebetween, because in such other combinations, part of the dark portions of the assumed reticle of the image I will always cover part of the light transmitting portions of the reticle G, which results in smaller maximum signal to be obtained from the photodiode P.

Figure 2:
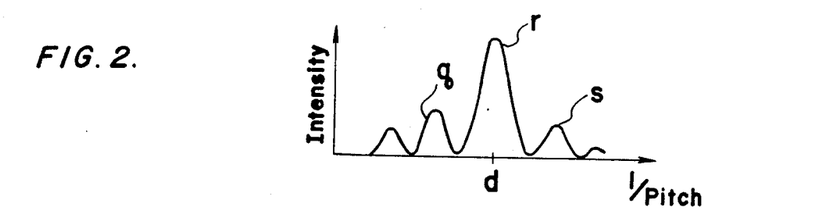
Figure 3:
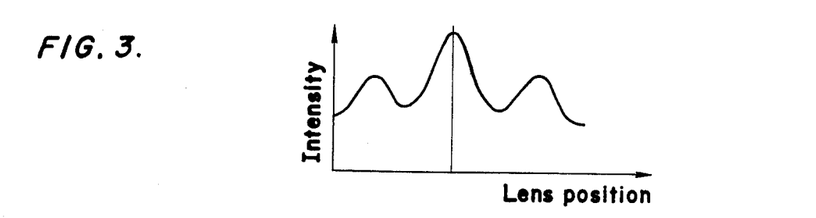

There also occurs such a case where the amount of light passing through the reticle G never varies in accordance with the movement of the reticle G. For example, if the pitch of the assumed reticle of the image I becomes twice as wide as that of the reticle G, that is to be in a ratio of 2:1, the same amount of the light is always allowed to pass through the transparent portions of the reticle G, in which case, no alternating signal is obtained from the output of the photodiode P. Besides the above mentioned combination of pitches, there still exists another combination of pitches, which does not fluctuate the amount of light passing through the reticle G and producing no alternating signals from the photodiode P. The relation between the pitches of the image I and the intensity of the signal obtained from the photoconductive transducer means P is shown in FIG. 2 wherein the abscissa represents reciprocal of the image pitch while the ordinate represents the intensity of the signal. At the point shown by the reference character $d$ is shown, the pitch between the bright and dark portions of the image is equal to the pitch of the reticle G. Generally, the image of the subject can be considered to be formed by strips of images having various spatial frequencies. However, by applying reticle G, the spatial frequency component having frequency of $1/d$ is mostly allowed to pass through the reticle G. In other words, in the arrangement of FIG. 1 the reticle G may be considered to be a filter which selectively allows the spatial frequency of $1/d$ to pass therethrough. The range of the spatial frequencies contained in the image is widest when the image is correctly focused. As the image grows faint, the range of the spatial frequencies becomes narrower, and closer to frequency range of 0. On the other hand, the reticle G with smaller pitches $d'$ may filter a higher spatial frequency $1/d'$ from other frequency components, which high spatial frequency is contained most in the correctly focused image. Therefore, by bringing the image from out of focus to sharp state, and then again to out of focus state, the obtained signal may have its peak value at a point when the sharp image is focused. However, due to the characteristics of the reticle G, some other spatial frequency may also pass through the reticle G as a noise, which result in another, but smaller, peak points obtained in both sides of the first mentioned peak point. Therefore, the enveloped wave form of the signal obtained from the photoconductive transducer means P can be described as a line shown in FIG. 3, wherein the abscissa represents lens position, substantially distance between the lens and the screen of reticle, and the ordinate represents the intensity of the signal.

It should be noted that the frequency of the alternating signal obtained from the photoconductive transducer means P or the photodiode has no relation to the spatial frequency. The frequency $f_0$ of the output signal is determined by the reticle pitch $d$ and can be expressed as follows:

$$f_0 = 1/d$$

According to the above equation, it is possible to obtain a high frequency of the alternating signal by making the reticle pitch $d$ small. The high frequency of the alternating signal will result in short period of one alternating cycle which enables the discrimination of the peak point to be preceeded in more precise manner. Therefore, it is desirable to fix the frequency of the alternating signal in comparatively high frequency within the tolerance of the subsequent electric system upon receiving and responding to the signal. In fixing the frequency of the alternating signal comparatively high, it is preferable to select the reticle pitch $d$ in comparatively small size so as not only to discriminate the peak point with accuracy, but also to filter the higher spatial frequency.

In search of the true focus setting position of the lens in relation to the subject to be photographed, the lens is moved in predetermined incremental degrees between near and hyperfocal positions by a suitable driving means. While said lens is being moved, the reticle G is also moved perpendicular to the axis of the light, so as to cut across the light rays and to obtain the signal from the photodiode P. At a moment when the peak point of the signal is obtained, the lens may cease to move by a control means and it is stopped at its position, which is supposed to be the correct focus setting position for the lens.

However, in such method the control means may catch a first rising peak point which may possibly be mistaken for real signal and such false signals cannot be readily eliminated. Thus, these conventional devices sometimes set the objective at an incorrect position.

Accordingly, a primary object of the present invention is to provide a control means capable of detecting the real peak point of the signal which is produced by the correctly focused image.

Another object is to provide an improved optical system for the automatic focusing apparatus.

Another object is to provide an improved reticle shifting means for the automatic focusing apparatus.

Figure 4:
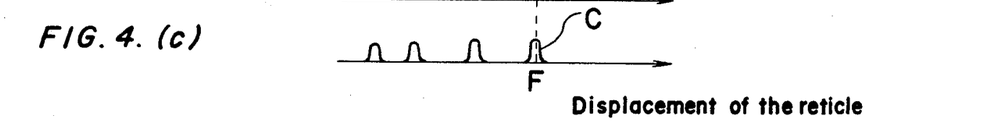

According to the present invention, the automatic focusing device comprises an optical system operating means which changes the distance between the lens L and the reticle G, simultaneously with the reticle shift which is perpendicular to the axis of the light, and the control means which has a peak value holding circuit means, wherein the peak value of the signal is held until the next higher peak value comes. In the control means, if the first peak value is greater than that of the second peak value, the first peak value is still held in the peak value holding circuit means. On the contrary, when the first peak value is smaller than that of the second peak value, the peak value holding circuit means now holds the second peak value. FIG. 4(a) shows a wave form of the signal A obtained from the photoconductive transducer means P. When this signal A is applied to the peak value holding means, the stairlike wave form, as shown in FIG. 4(b) of the output signal B from the peak value holding means is produced. In order to detect all the peak points until the maximum peak point arises, the output signal A from the peak value holding circuit means may be differentiated to provide a pulse signal C, as shown in FIG. 4(c), at every time when the peak point arises. These pulse signals C open a gate means to provide electrical signal (not shown) which is in relation to the operation of the optical system operating means to a memory means provided in the control means.

In each operation of this system, the last electrical signal which is in relation to the lens position memorized in the memory means gives a correctly focused position for the lens. The last electrical signal obtained in the memory means controls an optical system means in the camera or the like to set the lens position in optimum position thereof.

These and other objects and features of the present invention will become apparent from the following description taken in conjunction with the preferred embodiment thereof with reference to the accompanying drawings in which.

Before the description of the present invention proceeds, it is to be noted that like elements are designated by like reference numerals throughout several diagrams of the attached drawings.

Figure 5:
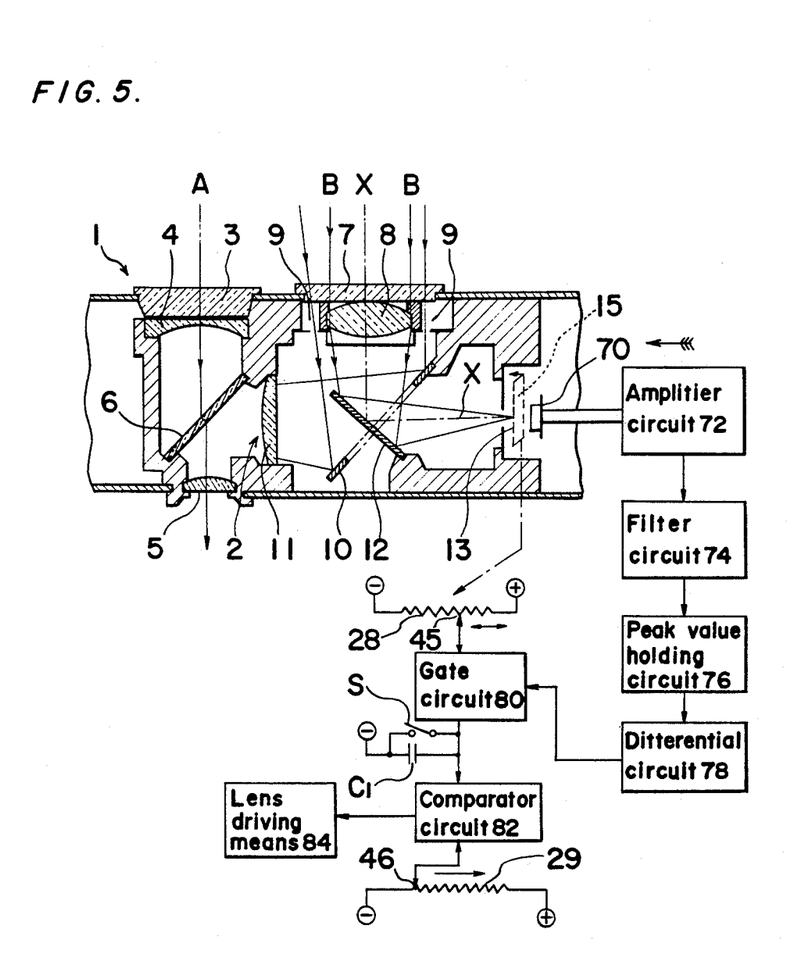
FIG. 5 is a schematic diagram of an automatic focusing apparatus of the present invention.

Referring now to FIG. 5, a view finder portion 1 of a camera (not shown) is furnished with an optical system assembled portion 2 for the present invention. The view finder portion 1 comprises a protect glass 3, an objective lens 4, and an ocular or eyepiece 5 as in conventional cameras. Between the objective lens 4 and the ocular 5, the view finder portion 1 further comprises a halfmirror 6, which is inclined at 45° in relation to the axis of the light beam A passing through the protect glass 3 and the objective lens 4. The optical system assembled portion 2 comprises a protect glass 7 and an objective lens 8 which is fixedly disposed adjacent to the protect glass 7 and its also smaller than the protect glass 7 in size. Around the periphery of the objective lens 8, a light passage 9 is provided. The light beam B which passes through this passage 9 is reflected by a ring shaped mirror 10 which is also inclined at 45° with respect to the path of said light beam B. Part of this light beam B reflected by the mirror 10 further passes through a condenser lens 11 and is reflected by the halfmirror 6 for being directed to the eyepiece for illuminating various indicators provided therein. In the hollow portion of the ring shaped mirror 10, a mirror 12 which is inclined at 45° in relation to the light beam B is provided. The light beam B which passes through the lens 8 is reflected by the mirror 12 and form an image on a range finding scanning member or a reticle 13.

Figure 6:
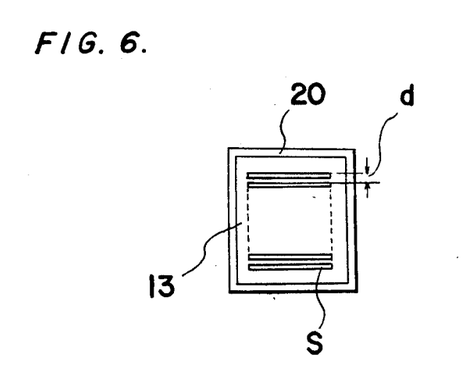
FIG. 6 is a plane view of a reticle employed in the apparatus of FIG. 5.

Referring also to FIG. 6, the reticle 13 is provided with numbers of slots $s$ at a pitch of $d$. The reticle 13 which is supported by a linkage means 15 mentioned later is disposed at the right of the mirror 12 and suitably spaced from the mirror 12 so that an image is formed thereon. The condition of the image formed on the reticle 13 varies as the optical distance between the lens 8 and the reticle 13 varies. According to the present invention, the reticle 13 is shifted by the linkage means 15 in parallel with the optical axis X from near to hyperfocal positions in search of the true focus setting position in relation to the subject to be photographed. In addition to said parallel movement of the reticle 13, the reticle 13 is also shifted by the linkage means 15 in a direction perpendicular to the optical axis X, so that the slots $s$ of the reticle 13 sequentially pass and intercept the incident light.

Figure 7:
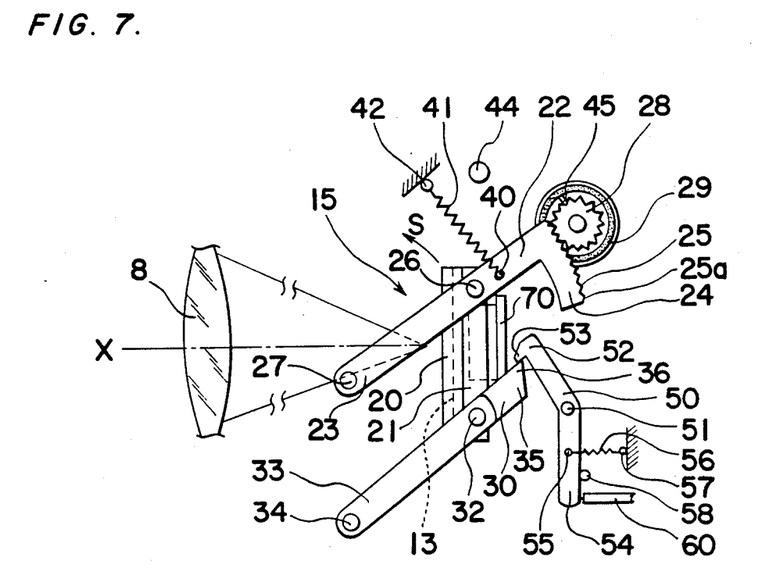
FIG. 7 is a schematic diagram showing an enlarged scale of a linkage means employed in the apparatus of FIG. 5.

Referring also to FIG. 7, there is shown linkage means 15 which supports the reticle 13. In the linkage means 15, the reticle 13 is held by a rectangular or a square shaped frame 20, while a supporting plate 21 is integrally formed with or fixedly mounted to at least one side of the frame 20. It should be noted that the reticle 13 is placed in the frame 20 in such a manner that the slots thereof are in parallel with the supporting plate 21. The supporting plate 21 is supported by two supporting arms 22 and 30 which are parallel to each other. The upper end portion of the supporting plate 21 is pivotally supported by the supporting arm 22, by a pin 26, while one end 23 of the supporting arm 22 is pivotally connected to a body of the camera (not shown) by a pin 27, with the other end 24 of the supporting arm 22 being provided with a portion 25 having teeth 25a which engages a gear 28. The lower end portion of the supporting plate 21 is pivotally supported by the supporting arm 30 by a pin 32. One end 33 of the supporting arm 30 is pivotally connected to the body of the camera (not shown) by a pin 34, while the other end portion 35 is provided with a corner portion 36 having an acute angle to engage with a hook member 50. The distance between the pin 26 and the pin 32 is equal to the distance between the pin 27 and the pin 34, so that these supporting arms 22 and 30 are always in parallel to each other. Adjacent to pin 26, a pin 40 is fixedly mounted on the supporting arm 22 for connecting one end of a spring means 41. The other end of the spring means 41 is connected to pin 42 secured to the body of the camera (not shown). The spring means 41 forces the supporting arm 22 to rotate counterclockwise about the pin 27 as indicated by an arrow S. Normally, these supporting arms 22 and 30 together with reticle are held in the position as shown in FIG. 7 by the hook member 50. The hook member 50 is pivotally supported by a pin 51 on the body of the camera. One end 52 of the hook 50 is integrally formed with an L-shaped hook portion 53, while a pin 55 is fixedly mounted at the lower portion of the hook member 50 for engaging one end of a spring means 56. The other end of the spring means 56 is engaged with a pin 57 provided on the body of the camera. The spring means 56 urges the hook member 50 to rotate counterclockwise. Normally, the hook member 50 is held in a position shown in FIG. 7 by a pin 58 which is extruding from the body of the camera and engages with right side face of the lower portion 54 of the hook member 50. Adjacent to the pin 58, a rod 60 which reciprocally moves simultaneously with the release of the shutter button (not shown) is provided, which rod 60 starts operation of the automatic focusing apparatus. When the rod 60 pushes the lower portion 54 of the hook member 50 in FIG. 7, the L-shaped hook portion 53 thereof disengages from the portion 36 of the supporting arm 30 which causes the reticle 13 to move forwardly and upwardly in a diagonal direction. It should be noted that the diagonal movement of the reticle 13 contains a movement in parallel to the optical axis X, and a movement perpendicular to the optical axis X with a velocity of $v$. While the supporting arm 22 rotates, the teeth 25a of the portion 25 rotates the gear 28. The gear 28 is fixedly mounted on a rotatable shaft of a potentiometer 29, with a slider arm 45 being secured to the gear 28 for sliding along the resistor of the potentiometer 29 according to the position of the reticle. The supporting arm 22 is limited in its further rotation upon engagement with a pin 44 which is provided adjacent to the pin 42. This engagement finishes one operation of the automatic focusing apparatus.

Figure 8:
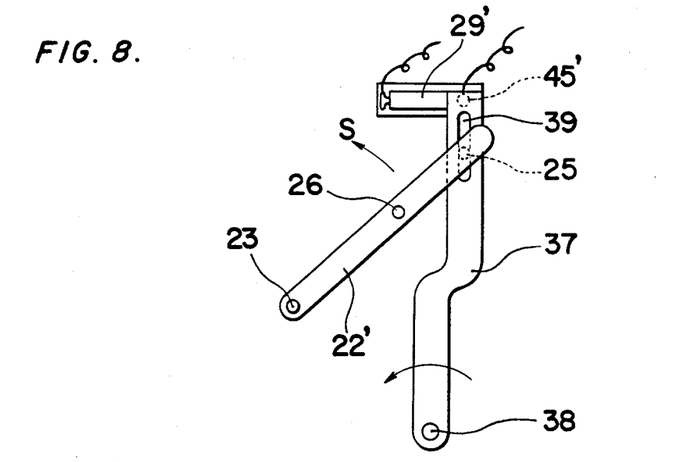
FIG. 8 is also a similar diagram to FIG. 7, but particularly shown a modification thereof.

Referring to FIG. 8, there is shown a modification of the linkage means 15 of FIG. 7. In this modification, potentiometer 29 of the linkage means 15 described as composed of a circular resistor and the slider arm 45 in the above embodiment is replaced by a potentiometer 29'. The potentiometer 29' in FIG. 8 comprises a linear resistor and a slider arm 45' which slides linearly along the resistor 29'. The slider arm 45' is engaged with upper end portion of a link 37, and the other lower end portion thereof is rotatably connected to the body of the camera by a suitable pin 38. Adjacent to the upper end of the link 37, an elongated slot 39 is formed in the link 37. A pin 25' which is fixedly mounted on the upper end portion of the supporting arm 22' slidably engages with the elongated slot 39. The lower end portion of the arm 22' is pivotally connected to the body of the camera by a pin 23. It should be noted that the arm 22' supports the frame 20 by the pin 26 and is rotated by the spring means 41 in the same manner as described in the first embodiment. Other components of the linkage means in this embodiment is exactly the same as the first embodiment, so that the detailed description thereof is omitted for the brevity.

It should be noted that the optical system assembly means together with the reticle for detecting the correctly focused image established on the reticle may be replaced by any conventional detecting means as long as said detecting means produces a signal relating to the sharpness of the focused image.

Again referring to FIG. 5, the output terminal of the photocell 70 is connected in series successively to, an amplifier circuit 72, a filter circuit 74, a peak value holding circuit 76, a differential circuit 78, and a gate circuit 80. The signal obtained from the photocell is first amplified by the amplifier circuit 72, wherein the frequency component of $v/d$ is allowed to pass therethrough wherein $v$ is the velocity of the reticle movement prependicular to the optical axis X, and the $d$ is pitch of the slots in reticle, and noises, such as due to flickering of a fluorescent lamp owing to the alternating current of the commercial electric power, due to fluttering of the subject in the wind, due to shimmering of the heat waves, are eliminated. The positive side of the enveloped wave form of the signal A obtained after the first circuit is shown in FIG. 4(a).

It should be noted that the actual signal obtained from the filter circuit 74 rapidly alters between the positive and negative sides of the enveloped wave form of the signal. In this embodiment the alternating component of the signal is not rectified, but the signal with alternating component is directly provided to the peak value holding circuit 76, wherein, only the peak value of alternating signal is maintained. Therefore, the output wave form obtained from the peak value holding circuit 76 would be as shown in FIG. 4(b) (signal B). The peak values of signal A applied to the peak value holding circuit 76 appears intermittently and increasingly until the maximum peak value appears, so that the output wave form of the peak value holding circuit 76 would produce a signal C having a step-like form, as shown in FIG. 4(c), until the maximum peak value arises, which is maintained throughout the rest of the operation. The signal B from the peak value holding circuit 76 is provided to the differential circuit 76, wherein the signal $b$ is differentiated and produces a signal C as shown in FIG. 4(c). The pulse wave of the signal C appears every time when the peak value arises in signal A until the maximum peak value arises. It should be noted that the pulse waves do not appear after the maximum peak value has risen in the signal A. These pulse waves are provided to the gate circuit 80 to open the gate and connects the input and output of the gate circuit at every pulse rising period. The input terminal of the gate circuit 80 is connected to the slider arm 45 of the potentiometer 28, wherein a suitable voltage is applied to the potentiometers 28. The output terminal of the gate circuit 80 is connected to one side of a capacitor $C_1$, and the otherside thereof is grounded. A switch is connected in parallel with the capacity $C_1$ to discharge after each operation. Said one side of the capacitor $C_1$ is further connected to a first input terminal of a comparator circuit 82. A second input terminal of a comparator circuit 82 is connected to a slidable connecting point 46 of a potentiometer 29, wherein said suitable voltage is also applied thereto. The slider arm 46 is shifted along the potentiometer 29 from left side to right side in FIG. 5 by a suitable driving means (not shown). The output of the comparator 82 is connected to the input of a lens driving means 84, which reciprocally displaces the camera lens or the objective lens assembly employed in the apparatus between near and hypertocal positions. In accordance with the rotating movement of the arm 22, the slider arm 45 slides along the resistor of the potentiometer 28 from the left side to right side in FIG. 5, thus gaining a voltage applied on the slider arm 45. However, said voltage can pass through the gate circuit 80 at a time only when the pulse signal is applied to the gate circuit 80. The voltage which is passed through the gate circuit 80 is further applied to the capacitor $C_1$ to memorize the voltage which is passed therethrough. While the capacitor $C_1$ memorizes the voltage, the slider arm 46 is shifted along the resistor of the potentiometer 29 from left side to right side in accordance with the displacement of the camara lens by a lens driving means 84. In the comparator 82, said memorized voltage is compared with the voltage applied to the slider arm 46, and produces a signal which controls the lens driving means 84. When the voltage applied to the slider arm 46 is smaller than the voltage charged in the capacitor $C_1$ the comparator 82 does not produce any signal to the lens driving means 84, so that the camera lens is continually shifted. On the other hand, when the former voltage balances or proceeds the latter voltage, the comparator 82 produces a voltage signal to cease the lens driving means 84, so that the camera lens remains stationary. It should be noted that the final trigger pulse which opens the gate circuit 80 to charge the capacitor $C_1$ of the voltage relating to the reticle position, coincides with the maximum peak value point produced from the filter circuit 74. In other words, coincides with a moment when the image on the reticle 13 is correctly focused. Therefore, by preadjusting the velocity of displacement of the camera lens in relation to the reticle movement, and by controlling the lens driving means 84 with the voltage charged in the capacitor $C_1$, it is possible to set the camera lens in correctly focused position. The capacitor $C_1$ is discharged after the end of each shutter release by the switch S operated by a suitable operating means (not shown).

Figure 9:
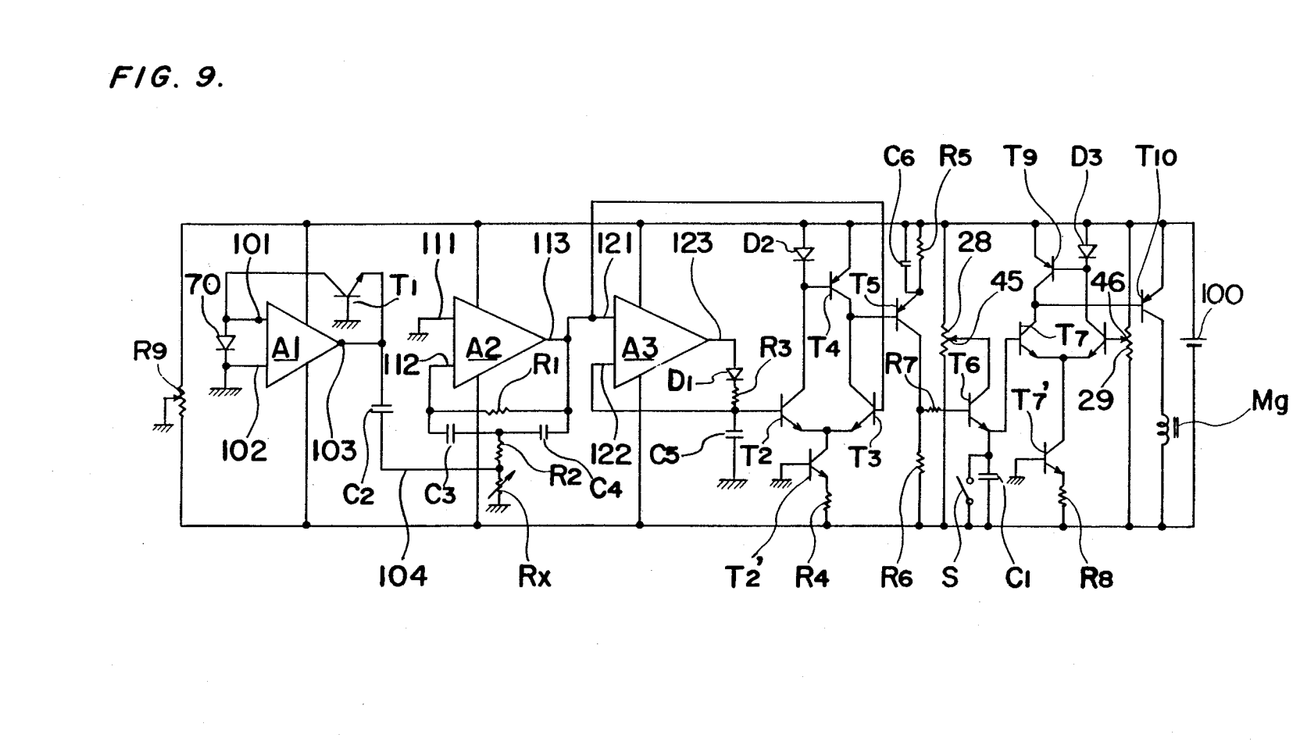
FIG. 9 is an electrical circuit diagram of the electric control system of the apparatus of the present invention.

Referring to FIG. 9, the photocell 70 is connected between the input terminals 101 and 102 of the operational amplifier $A_1$ which forms amplifier circuit 72, and noninverting input terminal 102 thereof is further grounded. Between the inverting input terminal 101 and an output terminal 103, a transistor $T_1$ for a logarithmic conversion is inserted with its collector and emitter being connected to the terminals 101 and 103, respectively. A base of the transistor $T_1$ is grounded. The output terminal 103 is connected to a noninverting input 112 of an operational amplifier $A_2$ which forms the filter circuit 74 through a series connection of a capacitor $C_2$, a resistor $R_2$ and a capacitor $C_3$. At a point between the capacitor $C_2$ and the resistor $R_2$, a lead 104 is grounded through a variable resistor $R_x$. A lead 105 connecting the resistor $R_2$ and the capacitor $C_3$ is connected with an output terminal 113 of the operational amplifier $A_2$ through a capacitor $C_4$, and a resistor $R_1$ is connected in parallel with the series connection of capacitors $C_3$ and $C_4$. An inverting input terminal 111 of the operational amplifier $A_2$ is grounded, and the output terminal 113 thereof is connected to an inverting input terminal 121 of the operational amplifier $A_3$. A noninverting input terminal 122 and an output terminal 123 of the amplifier $A_3$ are connected through a series connection of a resistor $R_3$ and a diode $D_1$ with its anode facing the noninverting input terminal 122. The noninverting input terminal 122 is also connected to the ground through a capacitor $C_5$ which forms the peak value holding circuit 76. Power supplying terminals of the operational amplifiers $A_1$, $A_2$ and $A_3$ are connected with a suitable power supply 100 and also connected with a variable resistor $R_9$ for determining a reference level of the signals to be on zero. The noninverting input terminal 122 is connected to a base of a transistor $T_2$. A collector of the transistor $T_2$ is connected to a plus terminal of the power supply 100 through a diode $D_2$ in a forward direction, and an emitter thereof is connected to a collector of a transistor $T_2'$ which for constant current source. An emitter of the transistor $T_2'$ is connected to a minus terminal of the power supply 100 through a resistor $R_4$, and a base thereof is grounded. The emitter of the transistor $T_2$ is further connected to an emitter of a transistor $T_3$. A collector and a base of the transistor $T_3$ are connected to a collector of a transistor $T_4$ and the inverting input terminal 121 of the operational amplifier $A_3$, respectively. An emitter and a base of the transistor $T_4$ are connected to the plus terminal of the power supply 100 and the collector of the transistor $T_2$, respectively. These transistors $T_2$, $T_2'$, $T_3$ and $T_4$ form the differential circuit 78. The collector of the transistor $T_3$ is connected to the base of a transistor $T_5$. An emitter of the transistor $T_5$ is connected to the plus terminal of the power supply 100 through a parallel connection of a capacitor $C_6$ and a resistor $R_5$, and a base thereof is connected to the minus terminal of the power supply 100 through a resistor $R_6$. The collector of the transistor $T_5$ is also connected to a base of a transistor $T_6$ through a resistor $R_7$. The collector of the transistor $T_6$ is connected to the slider arm 45 of the potentiometer 28 which is connected in parallel to the power supply 100. It should be noted that this slider arm 45 is moved by the movement of the supporting arm 22. These transistors $T_5$ and $T_6$ form the gate circuit 80. The emitter of the transistor $T_6$ is connected to the minus terminal of the power supply 100 through a parallel connection of the capacitor $C_1$ and the switch S. Said emitter of the transistor $T_6$ is further connected to the base of the transistor $T_7$. The collector and the emitter of the transistor $T_7$ are connected to the collector of a transistor $T_9$ and the collector of a transistor $T_7'$, respectively. The emitter of the transistor $T_9$ is connected to the plus terminal of the power supply 100, and the emitter of the transistor $T_7'$ is connected to the minus terminal of the power supply 100 through a resistor $R_8$. The base of the transistor $T_7'$ is grounded. The emitter of the transistor $T_7$ is further connected to the emitter of the transistor 8. The collector of the transistor $T_8$ is connected to the base of the transistor $T_9$ and also to the plus terminal of the power supply 100 through a diode $D_3$ which is in forward direction. These transistors $T_7$, $T_7'$, $T_8$ and $T_9$ form the comparator circuit 82. The base of the transistor $T_8$ is connected to the slider arm 46 of the potentiometer 29. This potentiometer 29 is connected in series with the power supply 100. It should be noted that the slider arm 46 is slided by a suitable motor means (not shown) which cooperates with the lens driving means 84. The collector of the transistor $T_7$ is further connected to the base of the transistor $T_{10}$. The emitter and the collector of the transistor $T_{10}$ are connected to the plus terminal and the minus terminal of the power supply 100 through an electric magnet Mg. This electric magnet Mg switches the lens driving means 84.

In above mentioned circuit, the signal obtained from the photocell 70 is amplified by the operational amplifier $A_1$ and filtered in the operational amplifier $A_2$. The variable resistor $R_x$ is for adjusting the filtering frequency $f_0$. The operational amplifier $A_3$ is provided for matching the impedance of the filter circuit 74 with the impedance of the peak value holding circuit 76, and therefore its amplification is one. The capacitor $C_5$ is charged with the signal from operational amplifier $A_3$ through the diode $D_1$, so that the capacitor $C_5$ holds the maximum peak value provided thereto. The resistor $R_3$ is provided to delay the charging period, i.e., to provide a certain time constant to the capacitor $C_1$. The charged voltage in the capacitor $C_5$ is provided to the base of the transistor $T_2$ which forms a differential amplifier together with the transistor $T_3$. The base of the transistor $T_3$ directly receives the signal obtained from the output of the operational amplifier $A_2$. If the resistor $R_3$ is not provided, the transistors $T_2$ and $T_3$ will be in balanced condition while the capacitor $C_5$ is being charged with the further increasing voltage. However, with resistor $R_3$ provided in the circuit, the increasing voltage being charged in the capacitor $C_5$ slightly delays in comparison with the increasing voltage obtained from the output terminal 113 of the operational amplifier $A_2$, which results in the base voltage of the transistor $T_2$ to be smaller than that of the transistor $T_3$. This unbalanced situation in the differential amplifier, which occurs in the period only when the capacitor $C_5$ is being charged, decreases the current flowing through the transistor $T_2$ and increases the current flowing through the transistor $T_3$. In other periods than the above mentioned period, the base voltage of the transistor $T_2$ is greater than that of the transistor $T_3$. In this case, the current flowing through the transistor $T_2$ increases and the current flowing through the transistor $T_3$ decreases. In the period when the current flowing through the transistor $T_3$ increases and the current flowing through the transistor $T_2$ decreases, the transistors $T_4$, $T_5$ and $T_6$ are respectively brought to conductive, non-conductive and conductive conditions. The conductive condition of the transistor $T_6$ allows the current to flow therethrough to charge the capacitor $C_1$ with the voltage applied on the slider arm 45 of the potentiometer 28. This memorized or charged voltage in the capacitor $C_1$ is compared with the voltage obtained from the potentiometer 29 in the comparator circuit 82. It should be noted that the latest charged voltage in the capacitor $C_1$ is the greatest. Normally, the charged voltage is greater than the voltage obtained from the potentiometer 29, because the slider arm 46 gradually increases its potential by the linear displacement of its position. When the voltage applied on the connecting point 46 balances or exceeds the charged voltage, the transistor $T_7$ is cut off and the transistor $T_{10}$ is actuated, and as a result, the electric magnet Mg is excited and breaks the switch for the lens driving means 84, to cease the displacement of the camera lens. The final position of the camera lens will give a correctly focused image of the subject to be photographed on the surface of the film provided in the camera.

The automatic focusing apparatus of the present invention can eliminate the false peak point which might control the displacement of the camera lens, by the arrangement of the circuits described above, employing no complicated mechanical nor optical works. Since the detection of the peak point totally depends on the electric circuit, the signal for controlling the camera lens position can be obtained in high reliability, when compared with the detection effected by mechanical or optical devices.

Although the present invention has been fully described by way of example with reference to the attached drawings, it is to be noted that various changes and modifications are apparent to those skilled in the art. Therefore, unless otherwise, such changes and modifications depart from the scope of the present invention, they should be construed as included therein.

What is claimed is:

1. Automatic focusing apparatus for an optical system which forms an image of an object on an image plane, comprising:
    a. photoelectric means;
    b. optical means for forming substantially the same image as that focused by said optical system on said image plane, said photoelectric means being so constructed to generate output signal continuously in response to brightness distribution in the image formed thereon by said optical means;
    c. means for changing distance between said photoelectric means and said optical means;
    d. means for generating an electric signal representative of said distance;
    e. circuit means for holding peak value in the outputs of said photoelectric means;
    f. storing means for storing said distance signal;
    g. gate means for allowing said distance signal to enter said storing means only when said gate means is open;
    h. first comparator means for comparing peak value held by said circuit means with output signal of said photoelectric means and for opening said gate means when a peak value larger than held one is detected; and
    i. means for adjusting said optical system in accordance with distance signal finally stored in said storing means.

2. Automatic focusing apparatus as claimed in claim 1, wherein said photoelectric means includes means for defining light sensitive area so that the light sensitive area may be the form of plurality of strips arranged in parallel with each other.

3. Automatic focusing apparatus as claimed in claim 2, wherein said means for defining includes a light blocking plate having a plurality of slits for alternatively passing light to a photosensitive surface.

4. Automatic focusing apparatus as claimed in claim 3, further comprises means for displacing said photoelectric means substantially perpendicular to an optical axis of said optical means.

5. Automatic focusing apparatus as claimed in claim 4, wherein said means for changing distance includes means for displacing said photoelectric means along the optical axis of said optical means.

6. Automatic focusing apparatus as claimed in claim 1, wherein said means for changing distance includes means for displacing said photoelectric means in a predetermined direction consisting of two components, one of said components being perpendicular to an axis of light which is forming said image so as to select a predetermined spatial frequency of said light and to allow the selected spatial frequency to pass through said image plane, and the other of said components being in parallel to said axis so as to obtain a correctly focused image on said image plane.

7. Automatic focusing apparatus as claimed in claim 1, further comprises an amplifier circuit means for amplifying said output signal of photoelectric means.

8. Automatic focusing apparatus as claimed in claim 7, further comprises a filtering circuit means for eliminating noises in said output signal of photoelectric means.

9. Automatic focusing apparatus as claimed in claim 1, wherein said means for adjusting comprises:
   a. driving means for shifting said optical system in parallel to an axis of said optical system;
   b. detecting means for detecting a position of said optical system, and for generating signal indicative of said position; and
   c. second comparator means for comparing said signal indicative of said position with said distance signal, and for generating control signal when said signal indicative of said position becomes equal to said distance signal, whereby said drive means stops to shift said optical system when receiving said control signal.

10. Automatic focusing apparatus as claimed in claim 1, wherein said circuit means for holding peak value comprises a first capacitor for charging a voltage of said output signal of said photoelectric means, and a resistor for obtaining predetermined time constant for said capacitor.

11. Automatic focusing apparatus as claimed in claim 1, wherein said storing means comprises a second capacitor for charging a voltage of said electrical signal representative of said distance.

12. Automatic focusing apparatus as claimed in claim 1, wherein said means for generating an electric signal representative of said distance comprises a first potentiometer having its slider arm being moved along a resistor of said first potentiometer in a speed in relation to the speed of changing distance between said photoelectric means and said optical means.

13. Automatic focusing apparatus as claimed in claim 8, wherein said detecting means comprises a second potentiometer having its slider arm being moved along a resistor of said second potentiometer in a speed in relation to the shifting speed of said optical system.

* * * * *